United States Patent [19]
van der Lely

[11] 3,971,445
[45] July 27, 1976

[54] CULTIVATORS
[76] Inventor: Cornelis van der Lely, 7, Bruschenrain, Zug, Switzerland
[22] Filed: Mar. 13, 1974
[21] Appl. No.: 450,738

Related U.S. Application Data
[63] Continuation of Ser. No. 233,133, March 9, 1972, abandoned.

[30] Foreign Application Priority Data
Mar. 12, 1971 Netherlands .................... 7103297

[52] U.S. Cl. .................................. 172/59; 172/125
[51] Int. Cl.² ..................................... A01B 33/00
[58] Field of Search .............. 172/59, 111, 129, 125

[56] References Cited
UNITED STATES PATENTS

| | | | |
|---|---|---|---|
| 3,028,919 | 4/1962 | Smith et al. ........................ | 172/125 |
| 3,667,551 | 6/1972 | van der Lely ....................... | 172/59 |
| 3,713,494 | 1/1973 | Berdrin ............................... | 172/59 |

Primary Examiner—Stephen C. Pellegrino
Attorney, Agent, or Firm—Mason, Mason & Albright

[57] ABSTRACT

This invention relates to soil cultivating implements or cultivators of the kind comprising a frame movable over the ground by a tractor or other operating vehicle and a plurality of soil working members arranged to be driven from the power take-off shaft of said tractor or other vehicle by way of a driving gear which includes a shaft arranged to be placed in connection with said power take-off shaft.

12 Claims, 6 Drawing Figures

CULTIVATORS

This is a continuation of application Ser. No. 233,133, filed Mar. 9, 1972, now abandoned.

According to one aspect of the invention, there is provided a cultivator of the kind set forth, wherein the driving gear also includes a branch shaft arranged to enable drive to be transmitted therefrom to the moving parts of another agricultural implement during the use of the cultivator in conjunction with such other agricultural implements.

For a better understanding of the invention, and to show how the same may be carried into effect, reference will now be made, by way of example, to the accompanying drawings, in which:-

Figure 1:
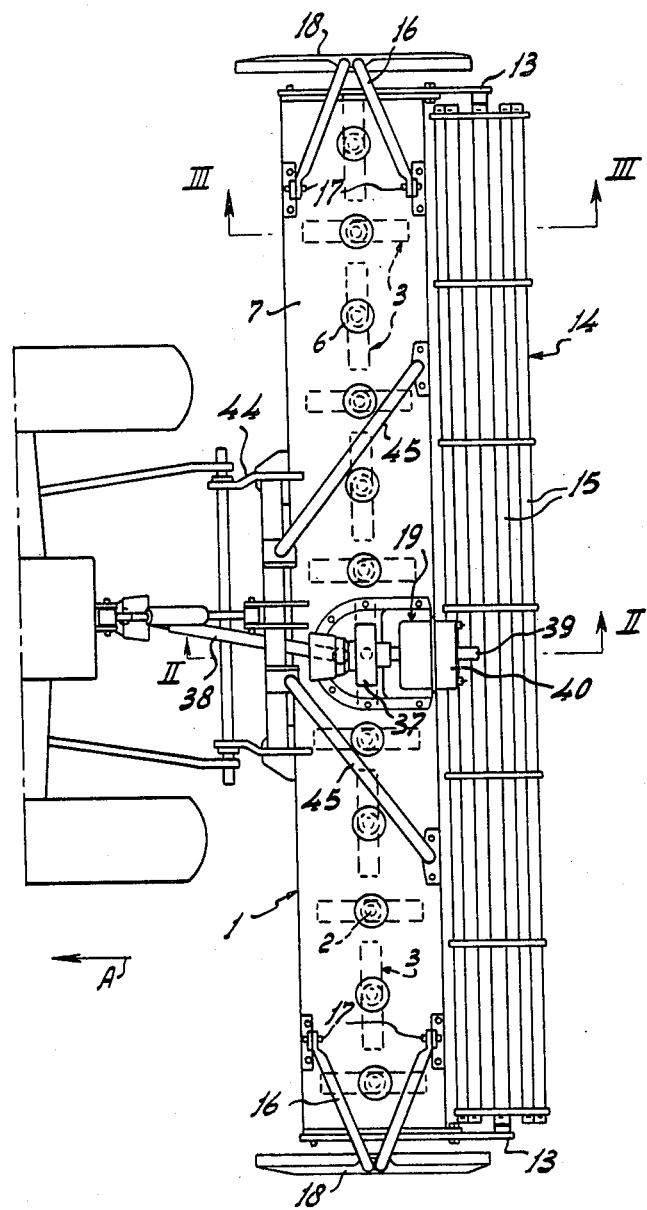
Figure 2:
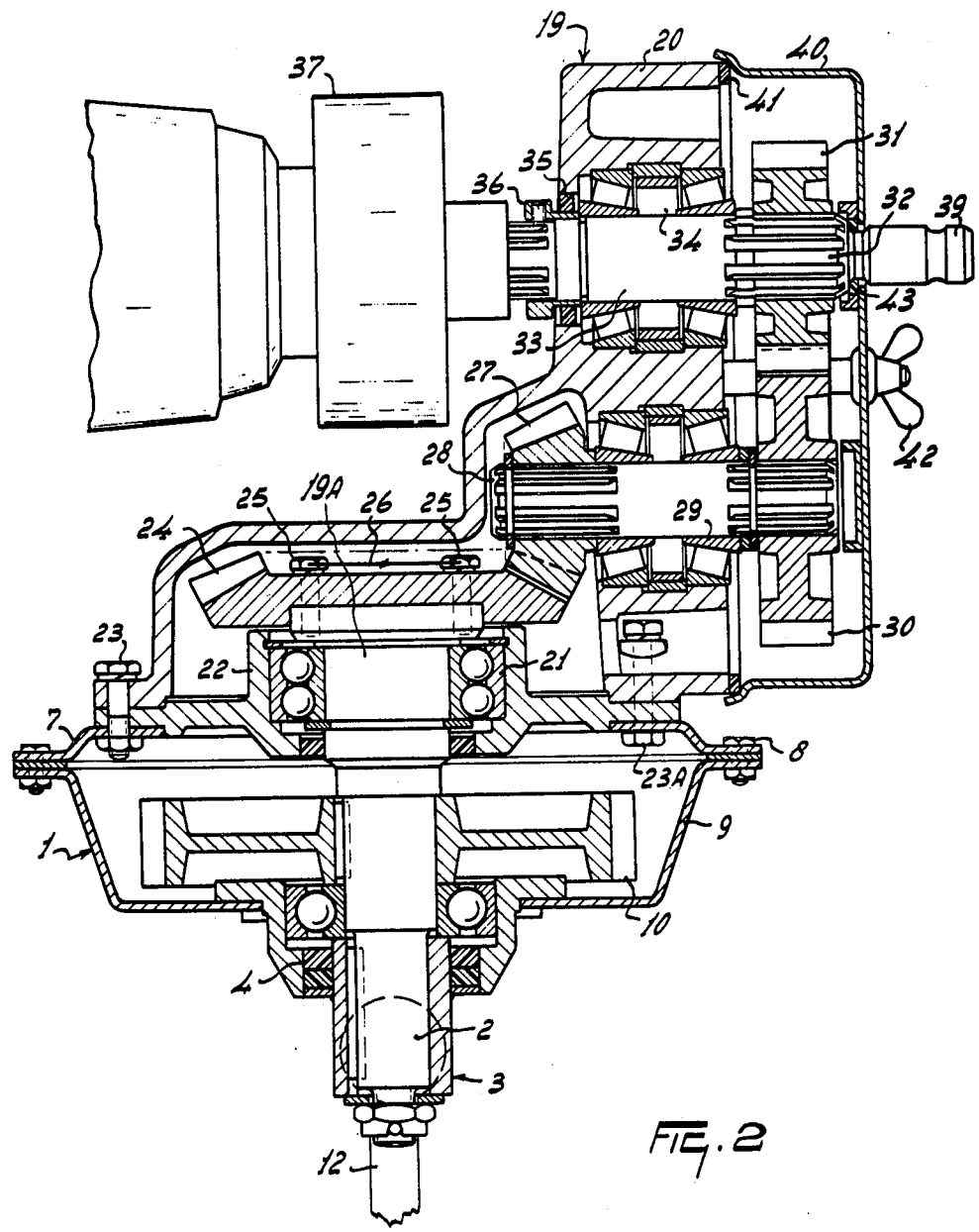
Figure 3:
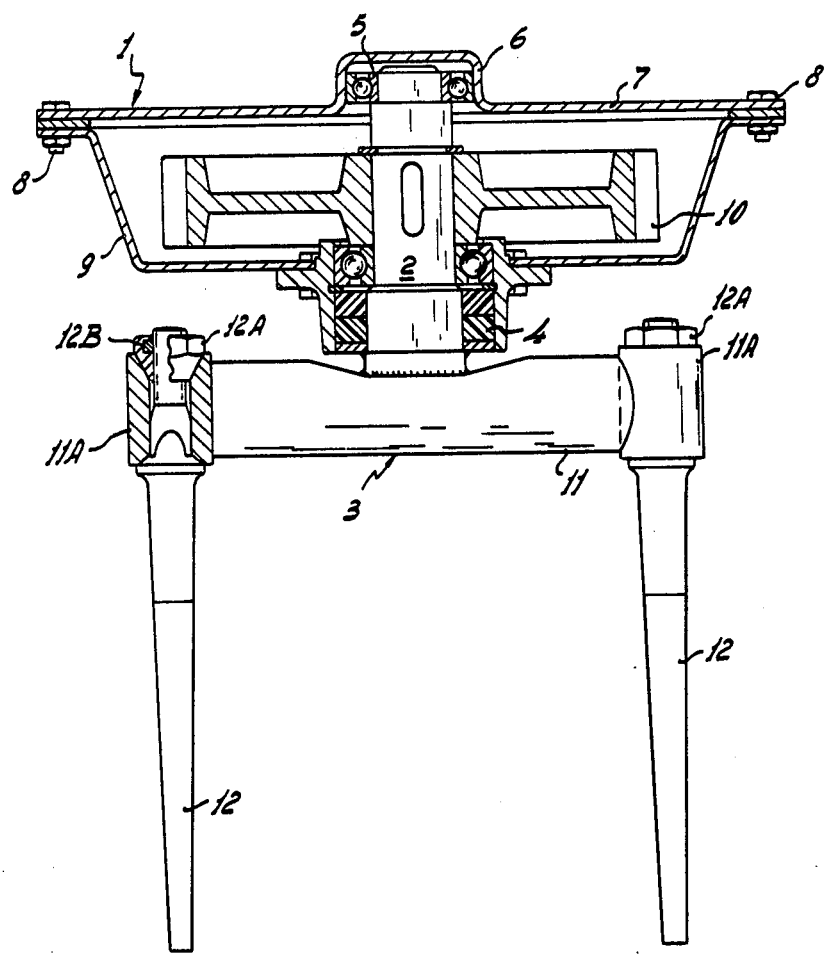
Figure 4:
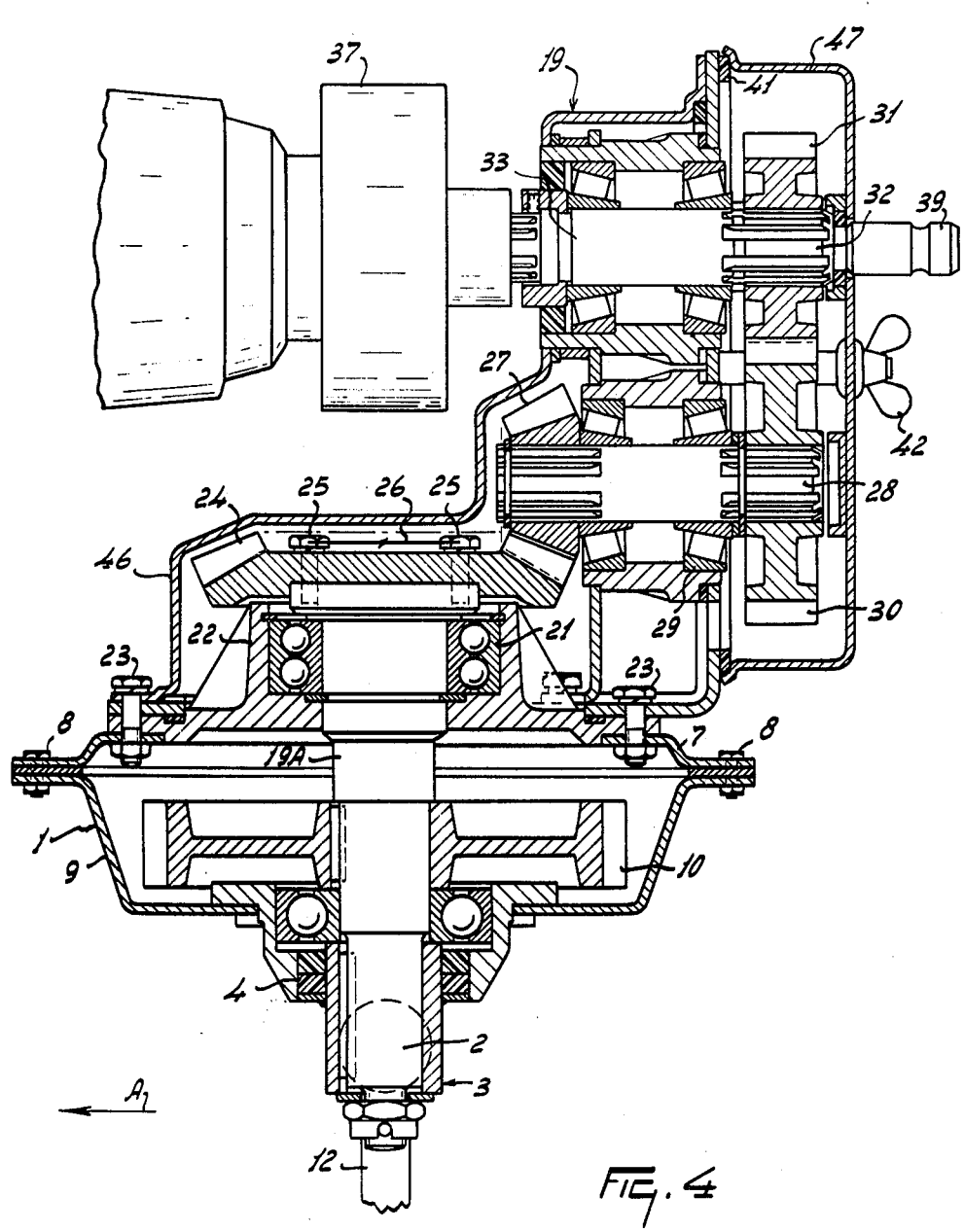
Figure 5:
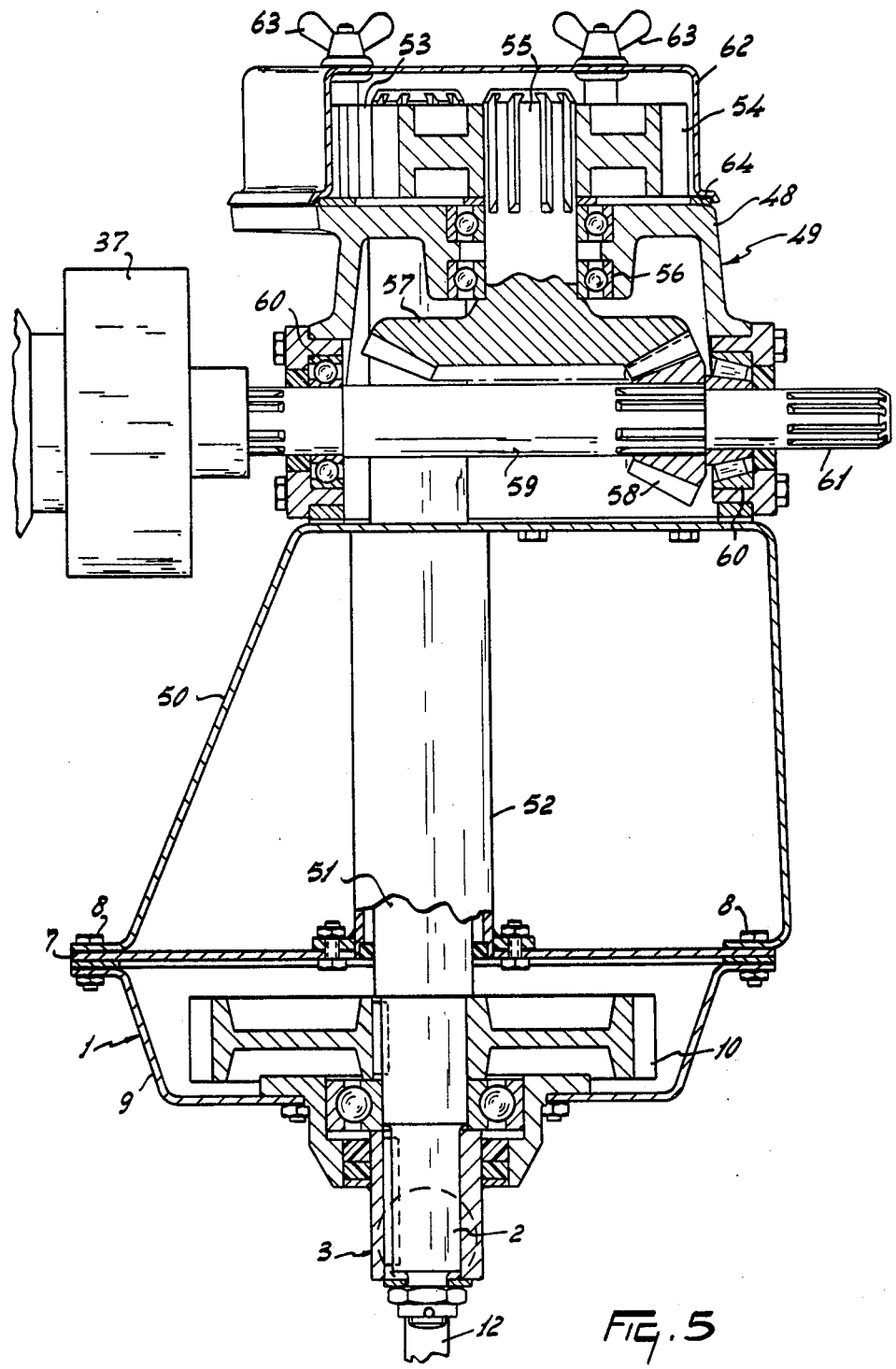
Figure 6:
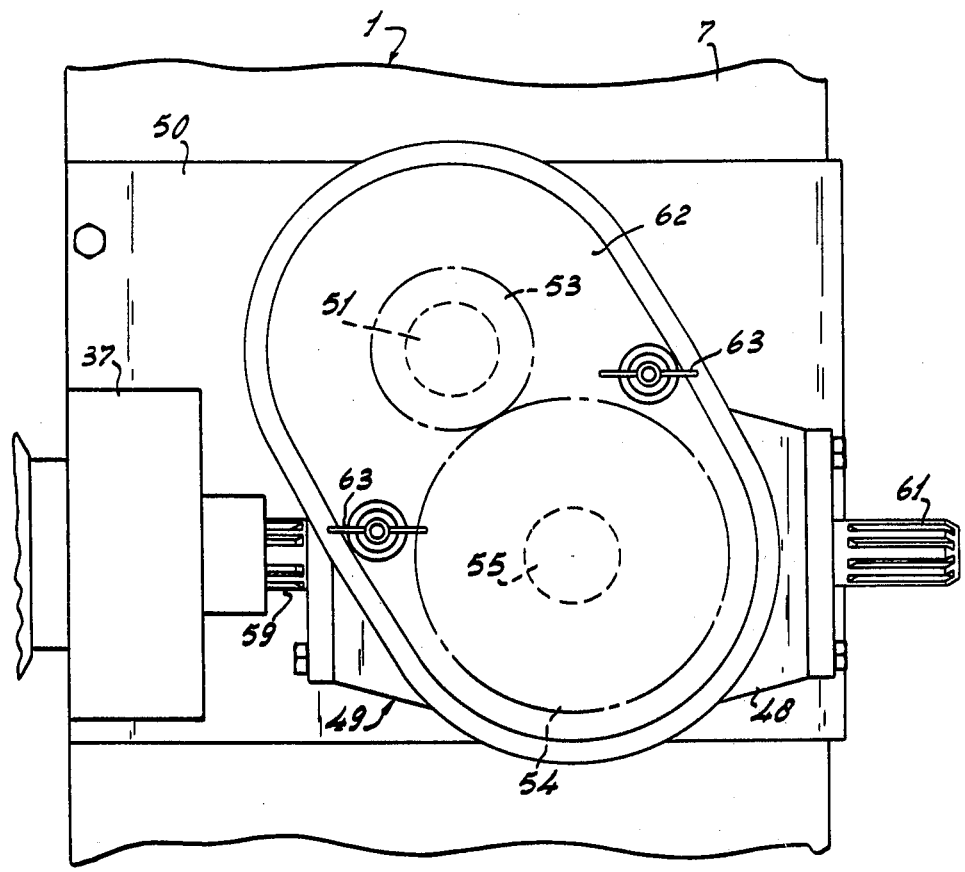

FIG. 1 is a plan view of a soil cultivating implement or cultivator in accordance with the invention;

FIG. 2 is a section, to an enlarged scale, taken on the line II—II of FIG. 1 showing driving gear of the cultivator in greater detail, FIG. 3 is a section, to an enlarged scale, taken on the line III—III of FIG. 1 but with the omission of some of the parts that appear in FIG. 1, FIG. 4 corresponds to FIG. 2 but shows an alternative construction, FIG. 5 corresponds to FIGS. 2 and 4 and shows a second alternative construction, and FIG. 6 is a plan view corresponding to FIG. 5.

Referring to FIGS. 1 to 3 of the drawings, the soil cultivating implement or cultivator that is illustrated has a hollow main frame beam 1 that extends substantially horizontally and substantially perpendicularly transverse to the intended direction of operative travel of the cultivator which is indicated by an arrow A in FIGS. 1 and 4 of the drawings. The beam 1 is preferably formed from sheet iron but could also be formed from other sheet metals. The hollow beam 1 carries a single row of soil working members 3 of which there are twelve in the embodiment that is being described. Each soil working member 3 is mounted at the lower end of a corresponding vertical or substantially vertical upright rotary shaft 2, the shafts 2 lying in side-by-side relationship in a row that extends parallel to the longitudinal axis of the beam 1. Each shaft 2 is journalled is a corresponding substantially vertical bearing 4 that is mounted in a recess in the bottom of the main frame beam 1. The upper end of each shaft 2 is rotatably mounted in a substantially vertical bearing 5 (FIG. 3) received in a housing 6 that forms part of a cover plate 7 which closes off the top of the hollow beam 1. It is preferred that the cover plate 7 should have a thickness of between 3 and 4 millimeters and it will be seen from FIG. 3 of the drawings that its edges are fastened to substantially horizontal rims of a lower portion 9 of the beam 1 that is of shallow U-shaped or channel-shaped cross-section by small bolts 8, a gasket being interposed between the cover plate and the rims. Each shaft 2 carries, internally of the main frame beam 1, a corresponding spur-toothed pinion 10, the pinions 10 being of such a size that the teeth of each one are in mesh with those of its neighbour or both of its neighbours.

The lowermost end of each shaft 2 projects downwardly from the bottom of the beam 1 beneath the corresponding bearing 4 and is secured, for example by welding, to the centre of a tine support 11 of the corresponding soil working member 3. The opposite ends of each tine support 11 are provided with substantially vertically extending sleeve-like tine holders 11A. Each tine holder 11A receives an upper fastening portion of a corresponding tine 12 at least the lower soil-working portion of which is of square or other angular cross-section. The upper fastening portion of each tine 12 terminates in a screw-threaded section which is entered upwardly through the tine holder 11A concerned to receive a correspondingly screw-threaded conical nut 12A. The nuts 12A are of a kind adapted to resist loosening due to mechanical shocks vibration and the like and incorporate thread-engaging insert rings 12B formed from, for example, nylon. It can be seen from FIG. 3 of the drawings that the upper fastening portion of each tine 12 incorporates a profiled collar which engages in the lower end of the corresponding holder 11A. The form of engagement between the collar and the holder 11A is such as to prevent the tine 12 from turning in the holder 11A once the nut 12A has been tightened and the arrangement is preferably such that the tine 12 can occupy any one of at least two different angular settings relative to the holder 11A about the longitudinal axis of that holder. The tines 12 are usually constructed so that their fastening portions and soil working portions are gently inclined to one another so that, with the arrangement which has just been outlined, the soil working portions thereof can either trail, or lead, relative to the intended direction of rotation of each soil working member 3. The soil working portions of the tines 12 will be arranged in trailing positions with respect to the directions of rotation of the soil working members 3 for the majority of operations of the cultivator. The perpendicular distance between the axes of rotation of neighbouring shafts 2 is preferably substantially 25 centimeters but the perpendicular distance between the lowermost ends or tips of the two tines 12 of each soil working member 3 is a little greater than this so that, during the use of the cultivator, the twelve individual strips of ground worked by the soil working members 3 overlap one another to produce a single broad strip of worked soil.

The opposite ends of the hollow main frame beam 1 have arms 13 connected to them so as to be turnable upwardly and downwardly about a substantially horizontal axis afforded by pivots located close to the front of the beam 1 with respect to the direction A; A soil compressing member in the form of a roller 14 is rotatably mounted between the rearwardly projecting ends of the two arms 13, said roller 14 comprising a plurality of relatively spaced circumferential elongated elements 15 which are supported by a plurality of plates of the roller 14 in such a way as to be movable turnably relative to those plates and so as to be capable of disconnection therefrom, and reconnection thereto, without difficulty. If desired, the elongated elements 15 may extend helically around the longitudinal axis of the roller 14 but this is not illustrated in the drawings. The arms 13 are provided with means by which the angular settings thereof about their pivotal connections with the main frame beam 1 can be changed, said means being such as to enable any chosen setting to be maintained. This arrangement governs the horizontal level of the axis of rotation of the roller 14 relative to that of the remainder of the cultivator and this is the principal factor in determining the depth of penetration of the tines 12 into the soil during any particular soil working operation. Two shield plates 18 are located just beyond the opposite ends of the row of soil working members 3 and are connected by arms 16 to substantially horizontal pivots 17 that define axes extending substantially parallel to the direction A. The shield plates 18 extend substantially parallel to the direction A and their general planes are normally substantially vertically disposed during operation of the cultivator. The lowermost edges of the shield plates 18 are arranged to slide over the ground surface during the use of the cultivator and the shield plates can move upwardly and downwardly about the axes defined by the pivots 17 to match undulations in the surface of the soil over which the cultivator is travelling. When the cultivator is to be transported from one place to another without performing any working operation, the shield plates 18 can be tilted upwardly about the axes defined by the pivots 17 through approximately 180° to bring them to inverted inoperative positions in which they bear downwardly upon the top of the main frame beam 1.

The soil working members 3 are arranged to be driven from a driving gear 19 afforded partly by a gear box 20 which is arranged slightly to the left of the centre of the cultivator, as viewed in the direction A, due to its connection to the sixth shaft 2 from the left end of the frame beam 1 as viewed in the same direction. The driving gear 19 also includes an upward extension 19A of the shaft 2 which has just been mentioned, the extension 19A being rotatably journalled in a substantially vertical ball bearing 21 that is mounted in a substantially circular support 22 which closes a similarly shaped aperture in the cover plate 7 of the main frame beam 1. The extension 19A of the sixth shaft 2 is located principally inside a lower region of the gear box 20 which latter is preferably made from cast iron and is fastened to the margins of the aperture in the cover plate 7 by the same bolts 23 and 23A that secure the substantially circular support 22 in its appointed position. A bevel pinion or crown wheel 24 is fastened to a boss at the top of the shaft extension 19A by bolts 25, a safety member 26 such as a length of wire entered through bores in the heads of the bolts 25 being provided for the positive prevention of the loosening of said bolts. The bevel pinion or crown wheel 24 is in driven connection with a smaller bevel pinion 27 mounted on splines at one end of a substantially horizontal driving shaft 28 that extends substantially parallel to the direction A. The driving shaft 28 is rotatably mounted in its appointed position with the aid of a double roller bearing 29 and the end of said shaft that is remote from the pinion 27 is also provided with a set of splines.

The rearmost end of the driving shaft 28 can have a spur-toothed pinion 30 slid onto its splines in a readily releasable manner and the teeth of this pinion 30 are in driven engagement with those of a similarly constructed and similarly mounted pinion 31 which is of a different size to the pinion 30. The pinion 31 is releasably mounted on a splined portion 32 of a shaft 33 disposed above, and parallel to, the driving shaft 28. The shaft 33 is rotatably mounted in an upper portion of the gear box 20 by a double roller bearing 34. A region of the shaft 33 immediately in front of the bearing 34 with respect to the direction A is surrounded by an oil seal 35 and a "safety" washer 36 beyond which washer a splined portion of the shaft projects forwardly in the direction A from the gear box 20. As shown in FIGS. 1 and 2 of the drawings, the leading splined end of the shaft 33 can be placed in driven connection with the power take-off shaft of an agricultural tractor or other operating vehicle by way of an intermediate telescopic transmission shaft 38 of known construction having universal joints at its opposite ends, a slip clutch or like slip coupling 37 being interposed between the rear end of the transmission shaft 38 and the gear box shaft 33 in order to guard against breakage in the event of one or more of the soil working members 3 becoming jammed during the use of the cultivator. It will be seen from FIG. 2 of the drawings that the shaft 33 has a rearward extension 39 beyond the splined portion 32 thereof and that said extension 39 projects outwardly through a hole in a cover 40 of the two pinions 30 and 31. The cover 40 is maintained in position by two wing nuts 42 and is thus quickly releasable from the gear box 20. A gasket 41 is compressed between a lip of the cover 40 and the gear box 20 and the hole in said cover through which the shaft extension 39 projects is provided with an oil seal 43. The shaft extension 39, which is integral with the shaft 33, can be considered as a branch shaft and it will be noted from FIG. 2 of the drawings that substantially all of the shaft 33 is located to the rear, with respect to the direction A, of a plane containing the axes of rotation of all of the shafts 2. Moreover, as viewed in the direction A, the connection between the leading end of the shaft 33 and the slip clutch or like slip coupling 37 is located above a substantially central region of the cultivator. As viewed in side elevation (FIG. 2), the upper region of the gear box 20 has a width in the direction A which amounts to only substantially half the width in the same direction of the lower region of said gear box.

The front of the main frame beam 1 with respect to the direction A carries a trestle-shaped coupling member 44 arranged for connection to the three-point lifting device or hitch of the same agricultural tractor or other vehicle whose power take-off shaft drives the transmission shaft 38 (see FIG. 1). The coupling member 44 is rigidly connected by rearwardly and downwardly divergent supports 45 to rear upper regions of the main frame beam 1. In the use of the cultivator, the coupling member 44 is connected to the three-point lifting device or hitch of the operating agricultural tractor or other vehicle and the power take-off shaft of that tractor is placed in driving connection with the shaft 33 by way of the transmission shaft 38 and slip clutch or like slip coupling 37. Due to the particular disposition of the shaft 33 which has previously been mentioned the slip clutch or like slip coupling 37 can be located substantially centrally at the top of the cultivator as can be seen in FIG. 1 of the drawings and the cultivator can be disposed at a minimum distance behind the tractor or other operating implement. This simplifies manoeuvering of the implement and is a particular advantage when working in small fields. Moreover, when the cultivator is lifted clear of the ground for inoperative transport by the three-point lifting device or hitch of the agricultural tractor or other operating implement, that lifting device or hitch is stressed to a lesser extent than would be the case if the cultivator were to be further to the rear of the tractor or other vehicle. The speed of rotation of the soil working members 3 can be changed, without altering the speed of rotation of the power take-off shaft which operates said members 3, merely by releasing the two wing nuts 42, lifting off the quickly releasable cover 40, and either interchanging the two pinions 30 and 31 on the shafts 28 and 33 or exchanging those pinions for an alternative co-operating pair having different numbers of teeth to those of the pinions 30 and 31. It will be realised that four different speeds of rotation of the soil working members 3 can be attained by the provision of only two different co-operating pairs of toothed pinions and that the number of different speeds that are possible can be increased by the provision of further alternative co-operating pairs of toothed pinions. Since the extension or branch shaft 39 is of smaller diameter than the splined portion 32 of the shaft 33, said extension 39 does not interfere with the mounting of pinions on said splined portion 32 or the removal of pinions therefrom once the cover 40 has temporarily been taken off. The shaft extension or branch shaft 39 can be used to supply rotary power for the operation of some other implement that is connected to the rear of the cultivator to perform a further operation upon the soil immediately following the action of the tines 12. Such implements can be seed drills, planting machines or implements for introducing fertilizer or liquid manure into the soil. With known machines moving parts of the additional implements are frequently driven by means of a ground wheel so that in operation irregularities in driving often cannot be avoided. The soil that is worked by the tines 12 is gently compressed by the roller 14 that is located immediately behind said tines, the construction of the roller 14 being such that it tends to crumble any unbroken lumps of soil that are left behind by the tines 12. The particular form of mounting of the rotary shafts 2 between the lower bearings 4 and the upper housing 6, said housings 6 being integral with the cover plate 7 which is formed from metal of only 3 to 4 millimeters in thickness, provides an inexpensive construction which is quickly and readily assembled, the weight of the whole cultivator being maintained as low as possible.

FIG. 4 of the drawing illustrates an alternative construction of the driving gear 19 but the remainder of the cultivator is substantially identical to that which has already been described with reference to FIGS. 1 to 3 of the drawings. However, in the case of the construction shown in FIG. 4, the gear box 20 is replaced by a gear box 46 that is formed in one piece by punching a flat metallic plate having a preferred thickness of between 3 and 4 millimeters. With this gear box construction, the supports or mountings of the various bearings are made of cast iron. The gear box 46 can thus be manufactured quickly and easily and, despite its light weight, the various bearings and the shafts which co-operate therewith are effectively and reliably supported. Once again, interchangeable and exchangeable pinions 30 and 31 are readily releasably mounted at the rear ends of the two shafts 28 and 33, a sealed cover 47 that is substantially identical to the previously described cover 40 being provided to maintain the lubricated pinions in their appointed positions and to prevent contamination thereof by external dirt.

FIGS. 5 and 6 of the drawings show a further alternative driving gear 49 which includes a cast iron gear box 48 arranged on top of a profiled plate 50 that is secured to the top of the main frame beam 1 by some of the same small bolts 8 are used to secure the cover plate 7 of said beam to the lower portion 9 thereof. Instead of the upward extension 19A, the sixth shaft 2 from the left when the cultivator is viewed in the direction A has an upward extension 51 which is entered through a tubular sleeve 52 that extends between an oil-sealed aperture in the cover plate 7 and the lower surface of an upper horizontal portion of the profiled plate 50. The extension 51 projects upwardly through an aperture in the plate 50 and on through the overlying gear box 48 to terminate inside a cover 62 releasably mounted on top of the gear box 48. The portion of the shaft extension 51 which is located inside the cover 62 is splined and a spur-toothed pinion 53 is slidably mounted thereon in a readily releasable manner. A further spur-toothed pinion 54 is in driving mesh with the pinion 53 and is also located inside the cover 62 at the upper splined end of a shaft 55 that extends parallel to the shaft extension 51. The shaft 55 is rotatably mounted in the upper wall of the gear box 48 with the aid of two ball bearings 56 and its lowermost end, located inside the gear box 48, carries, or is integral with, a bevel pinion or crown wheel 57. The teeth of said bevel pinion or crown wheel 57 are in driven mesh with those of a smaller bevel pinion 58 located inside the gear box 48 towards the rear end, with respect to the direction A, of a substantially horizontal shaft 59 that extends substantially parallel to the direction A. The shaft 59 is rotatably mounted in the gear box 48 by ball and roller bearings 60 and its leading splined end is arranged to be driven from the output side of the slip clutch or like slip coupling 37 in the same manner as has already been described for the leading end of the shaft 33.

The driving gear 49 includes a splined rearward extension 61 of the shaft 59 which extension constitutes a branch shaft. The rearward extension or branch shaft 61 serves the same purpose as the previously described rearward extension or branch shaft 39 and is coaxial, and integral, with the shaft 59. As in the previous embodiments, the two readily removable spur-toothed pinions 53 and 54 are inter-changeable and are also exchangeable for other pairs of co-operating pinions having different numbers of teeth to produce different speeds of rotation of the soil working members 3 in response to a single speed of rotation of the power take-off shaft which drives them. The cover 62 is maintained in its appointed position in a quickly releasable manner by two wing nuts 63, an oil-sealing gasket 64 being interposed between a lip of the cover 62 and the underlying gear box 48 to which said cover is secured by the wing nuts 63. It will be seen from FIG. 6 of the drawings that, in plan view, the shaft 55 is located obliquely behind the extension 51 of one of the shafts 2 with respect to the direction A. In this embodiment, the connection of the shaft 59 to the transmission shaft 38 by way of the slip clutch or like slip coupling 37 is not located centrally above the remainder of the cultivator, but it is still behind the leading wall of the main frame beam 1 with respect to the direction A so that the cultivator can still be connected to the three-point lifting device or hitch of the operating tractor or other vehicle at a relatively short distance behind that tractor or other vehicle. The fact that the interchangeable and exchangeable pinions are located beneath the cover 62 at the top of the cultivator makes access thereto particularly quick and simple in this embodiment.

Although certain features of the cultivating implements or cultivators which have been described and/or illustrated in the accompanying drawings will be set forth in the following claims as inventive features, it is emphasised that the invention is not necessarily limited to those features and that it encompasses within its scope all of the parts of the cultivating implements or cultivators that have been described and/or illustrated both individually and in various combinations.

What we claim is:

1. A cultivator attachment comprising a main frame beam and coupling means at the forward side of said beam, for direct and close connection to the rear of a prime mover, a plurality of rotatable soil-working members journalled on said frame beam, said soil-working members each being mounted on a rotary shaft and being in driving connection with driving means including a gear box positioned on said beam, the rotary shafts of said soil-working members extending in a row transverse to the direction of travel and said driving means including a driving shaft which in its entirety is located to the rear of a vertical plane that passes through said rotary shafts, said main beam being an elongated hollow member extending transverse to the direction of travel and housing meshed pinion gears of said driving means, each of said rotary shafts being secured to one of said pinion gears and one of said rotary shafts having its upper end in driving connection with said driving shaft, said driving shaft being connectable to a power take off of the prime mover, whereby said cultivator can be attached a minimum distance to the rear of the prime mover to improve maneuvering during operation and reduce stress during inoperative transport, said driving shaft being operatively connected to a branch shaft and the latter extending rearwardly and substantially horizontal for connection to another implement at the rear of said gear box placing same in driving connection with the same power take off that drives said soil-working members, said branch shaft projecting through an aperture in said gear box, the front of said beam being solely supported from the ground by said coupling means attached to the prime mover.

2. A cultivator as claimed in claim 1, wherein said pinion gears are in driving connection with a change speed gear and a drive shaft, said driving shaft and drive shaft extending substantially parallel to each other and both shafts being entirely located to the rear of said plane.

3. A cultivator as claimed in claim 1, wherein said branch shaft extends substantially horizontal and said driving shaft extends at an angle of about 90° to said branch shaft.

4. A cultivator as claimed in claim 1, wherein said driving means includes interchangeable pinion gears in said gear box to vary the speed of rotation of said soil-working members.

5. A cultivator as claimed in claim 4, wherein one of said interchangeable pinion gears is displaceable along said branch shaft.

6. A cultivator as claimed in claim 1, wherein said interchangeable pinion gears are housed in a cover on top of said gear box.

7. A cultivator as claimed in claim 1, wherein each rotary shaft is journalled in bearing means within said frame beam, said bearing means including a lower bearing secured in a recess at the bottom of said beam.

8. A cultivator as claimed in claim 1, wherein one of said rotary shafts has an upper extension which is in driving engagement with said driving shaft.

9. A cultivator as claimed in claim 8, wherein said extension is held in a tubular sleeve within a housing on top of said beam, said extension being in driving engagement with change speed gears located in said gear box and said box being positioned above said beam.

10. A cultivator as claimed in claim 2, wherein said drive shaft is integral with said branch shaft and directly connectable to the power takeoff.

11. A cultivator as claimed in claim 10, wherein said branch shaft is located above said driving shaft.

12. A cultivator attachment comprising a main frame beam and coupling means at the forward side of said beam, for direct and close connection to the rear of a prime mover, a plurality of rotatable soil-working members journalled on said frame beam, said soil-working members each being mounted on a rotary shaft and being in driving connection with driving means including a gear box positioned on said frame, the rotary shafts of said soil-working members extending in a row transverse to the direction of travel and said driving means including a driving shaft which is located, at least in part, to the rear of a vertical plane that passes through the rotary shafts, said driving shaft being connectable to a power take off of the prime moved, whereby said cultivator can be attached a minimum distance to the rear of the prime mover to improve manuevering during operation and reduce stress during inoperative transport, said driving shaft being operatively connected to a branch shaft and the latter extending rearwardly and substantially horizontal for connection to another implement at the rear of said gear box placing same in driving connection with the same power take off that drives said soil-working members, said branch shaft projecting through an aperture in said gear box, the front of said beam being solely supported from the ground by said coupling means attached to the prime mover.

* * * * *